(12) United States Patent
Lin et al.

(10) Patent No.: US 6,215,528 B1
(45) Date of Patent: Apr. 10, 2001

(54) METHOD AND APPARATUS FOR DIGITAL MULTI-STANDARD COLOR SIGNAL DEMODULATION

(75) Inventors: Jinan Lin, München; Maximilian Erbar, Villingen-Schwenningen, both of (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/252,703

(22) Filed: Feb. 18, 1999

(30) Foreign Application Priority Data

Feb. 25, 1998 (EP) .................................................. 98250069

(51) Int. Cl.[7] .................................................. H04N 9/66
(52) U.S. Cl. ......................... 348/641; 348/639; 348/507; 348/727; 348/640
(58) Field of Search .................................. 348/638, 639, 348/640, 641, 647, 507, 726, 727, 491; H04N 9/66

(56) References Cited

U.S. PATENT DOCUMENTS 5,136,369 * 8/1992 Bohme .................................. 348/727
5,635,995 * 6/1997 Strolle ................................. 348/638

FOREIGN PATENT DOCUMENTS

| 0329812 | * | 8/1989 | (EP) . | |
|---|---|---|---|---|
| 0486095A1 | | 5/1992 | (EP) | ................................ H03D/3/00 |
| 0597160A1 | | 5/1994 | (EP) | ................................ H04N/9/78 |
| WO91/12696 | | 8/1991 | (WO) | ............................ H04N/11/18 |

OTHER PUBLICATIONS

Copy of the European Search Report listing the above–cited references.
European search report dated Jul. 29, 1998.

* cited by examiner

*Primary Examiner*—Sherrie Hsia
(74) *Attorney, Agent, or Firm*—Joseph S. Tripoli; Robert D. Shedd

(57) ABSTRACT

The key component of a digital PAL or NTSC color decoder is a quadrature demodulator for these AM modulated signals. For a SECAM color decoder, however, an FM demodulation is required which is conventionally implemented using a Hilbert filter which is followed by a CORDIC processor and a differentiation stage. It would be advantageous if for multi-standard applications a general-purpose color demodulator for PAL, NTSC and SECAM systems could be implemented on one chip having as much as possible common demodulation processing stages. According to the invention a single common quadrature mixer is used for all three color systems. A resulting bias effect caused by the use of a single mixing frequency is corrected in a clamping stage. The bias effect can also be used for line identification.

8 Claims, 2 Drawing Sheets

METHOD AND APPARATUS FOR DIGITAL MULTI-STANDARD COLOR SIGNAL DEMODULATION

FIELD OF THE INVENTION

The invention relates to a method and to an apparatus for digital multi-standard PAL/NTSC/SECAM color demodulation.

BACKGROUND OF THE INVENTION

The key component of a digital PAL or NTSC color decoder is a quadrature demodulator for these AM modulated signals. For a SECAM color decoder, however, an FM demodulator is required which is conventionally implemented using a Hilbert filter which is followed by a CORDIC processor (coordinate rotation digital computer) and a differentiation stage. EP-A-0 597 160 discloses a corresponding digital stand-alone SECAM decoder. A CORDIC processor is described in more detail in EP-A-0 329 812 and EP-A-0 597 160 and in an article cited therein.

SUMMARY OF THE INVENTION

It would be advantageous if for multi-standard TV or VCR applications a multi-standard digital color demodulator for PAL, NTSC and SECAM TV systems could be implemented on one chip having as much as possible common demodulation processing stages. However, since PAL and NTSC use AM modulation whereas SECAM uses FM modulation with two different carriers for the color information in the composite video signal, a conventional solution for a digital SECAM color demodulator using a Hilbert filter as shown in EP-A-0 597 160 has little commonness to that for a digital PAL and/or NTSC color demodulator using a quadrature mixer. Thus, it seems to be inconvenient to combine both solutions on a multi-standard color demodulator chip for all of the three systems. However, the inventors have found a solution for this problem which allows to have a single common quadrature demodulator or mixer for all three color systems.

Accordingly, it is one object of the invention to disclose a method for digitally demodulating PAL, NTSC and SECAM color signals using at least one common processing stage. It is a further object of the invention to disclose an apparatus which utilises the inventive method.

According to the invention, the Hilbert filter disclosed in EP-A-0 597 160 is replaced by a quadrature mixer operating with a single mixer frequency in the first step of the SECAM color demodulation. For this quadrature mixer the already existing quadrature mixer for the PAL/NTSC demodulation can be used. Thereby for a major part of the color demodulation process a common structure is obtained.

In principle, the inventive method is suited for digital SECAM color signal demodulation, wherein the initial demodulation step is carried out using a quadrature mixer.

In principle the inventive apparatus is suited for digital PAL or NTSC or SECAM color signal demodulation and includes:

a quadrature mixer which outputs the PAL or NTSC color components or in case of SECAM an x and an y signal, wherein in case of SECAM a single mixing frequency is used resulting in a bias effect caused by the non-standard-matching color carrier mixing frequency or frequencies;

a stage, in particular a CORDIC processor, which in case of SECAM calculates the function arctan(y/x);

a subsequent stage in which a differentiation and a clamping is performed on the arctan(y/x) signal, wherein said bias effect is corrected by a corresponding clamping operation and wherein the SECAM color components are obtained through an identification of the U and V lines, or includes:

a quadrature mixer which outputs the PAL or NTSC color components or in case of SECAM an x and an y signal, wherein in case of SECAM the mixing frequency is switched line-alternately to one of the standard SECAM color carrier frequencies;

a stage, in particular a CORDIC processor, which in case of SECAM calculates the function arctan(y/x);

a subsequent stage in which a differentiation is performed on the arctan(y/x) signal, wherein the SECAM color components are obtained through an identification of the U and V lines.

BRIEF DESCRIPTION OF THE DRAWINGS

Embodiments of the invention are described with reference to the accompanying drawings, which show in.

DETAILED DESCRIPTION OF PREFERRED EMBODIMENTS

Figure 1:
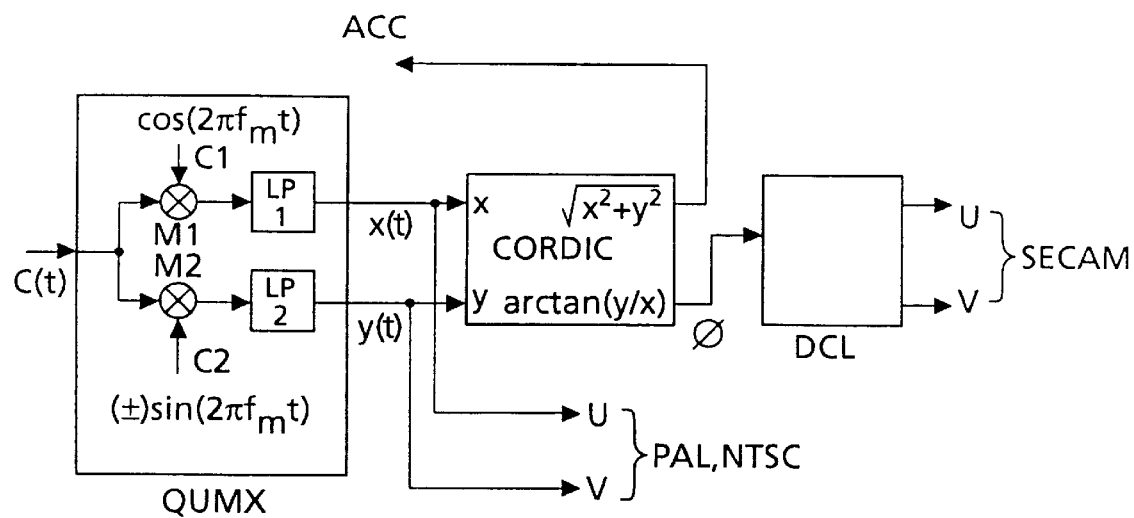
FIG. 1 structure of the inventive digital multi-standard color demodulator.

The digital input signal to the multi-standard color demodulator is the modulated color component signal c(t) after separation from the composite video signal (CVBS). Signal c(t) is fed to two parallel paths in a quadrature mixer QUMX. In the first path c(t) is multiplied in a first digital multiplier M1 by a first digital multiplicator signal C1. The output of M1 is digitally low pass filtered by a first filter LP1, leading to the first output signal x(t). In the second path c(t) is multiplied in a second digital multiplier M2 by a second digital multiplicator signal C2. The output of M2 is digitally low pass filtered by a second filter LP2, leading to the second output signal y(t). C1 can be expressed by e.g. $\cos(2\pi f_m t)$ and C2 is then $\pm\sin(2\pi f_m t)$, where $f_m$ is the mixer frequency.

If c(t) is a PAL or NTSC color component signal, x(t) represents the U or I component, respectively, and y(t) represents the V or Q component.

If c(t) is a SECAM color component signal the x and y signals are fed to respective inputs of a CORDIC processor, at the output of which a signal $\Phi=\arctan(y/x)$ is available which represents the input phase. As a by-product of the CORDIC processor the input amplitude $\sqrt{(x^2+y^2)}$ is calculated, which advantageously can be used as a control signal ACC for automatic color control.

Although SECAM uses two different color carriers the inventive circuitry uses a single mixer frequency only. Phase signal $\Phi$ passes a further stage DCL in which a differentiation and a clamping is performed on signal $\Phi$. The differentiation alone leads to the differentiated phase signal $\Delta\Phi$. The SECAM color components U and V at the output of DCL are then obtained through an identification of the U and V lines.

The following applies for SECAM signals. The input signal is:

$$c(t) = B'(t)\cos\left(2\pi\left[f_c(t) + k\int_0^t D^*(\tau)d\tau\right]\right)$$

where B' (t) is the amplitude, $f_c(t)$ is the modulation frequency, k is the modulation constant, and D* (t) is the color component to be demodulated.

The output of QUMX is:

$$x(t) = 1/2 * B'(t - \tau_{LP})\cos\left(2\pi\left[(f_c - f_m)(t - \tau_{LP}) + k\int_0^{t-\tau_{LP}} D^*(\tau)d\tau\right]\right)$$

$$y(t) = -1/2 * B'(t - \tau_{LP})\sin\left(2\pi\left[(f_c - f_m)(t - \tau_{LP}) + k\int_0^{t-\tau_{LP}} D^*(\tau)d\tau\right]\right)$$

where $\tau_{LP}$ is the delay caused by the low-pass and $f_m$ is the mixer frequency in M1 and M2.

The demodulation output signal, i.e. the differentiated output signal $\Phi$ (t) of the CORDIC processor, is:

$$\Delta\Phi(t) = -\Phi(t - \Delta * \tau) + \Phi(t)$$

$$= -\arctan\left[\frac{y(t - \Delta * \tau)}{x(t - \Delta * \tau)}\right] + \arctan\left[\frac{y(t)}{x(t)}\right]$$

$$= 2\pi * \Delta * \tau * kD^*(t-\tau_{LP}) + 2\pi * \Delta(f_c-f_m)\tau(\pm 2\pi)$$

with $$|2\pi * \Delta * \tau * kD^*(t-\tau_{LP}) + 2\pi * \Delta(f_c-f_m)\tau| < \pi,$$

where $\tau$ is the sampling rate (i.e. t=n*$\tau$ for n=0, 1, 2, 3, ... ) and $\Delta$ is an integer representing the differentiation interval.

The mixer frequency fm is switched for different systems. For PAL or NTSC $f_m$ is preferably equal to the color subcarrier frequency $f_c$ (4.43 MHz for PAL). For SECAM, it may be chosen as a value between that of the two color subcarriers 4.250 MHz and 4.406 MHz. The bias in the QUMX output caused by the frequency differences is compensated in DCL by clamping.

Figure 4:
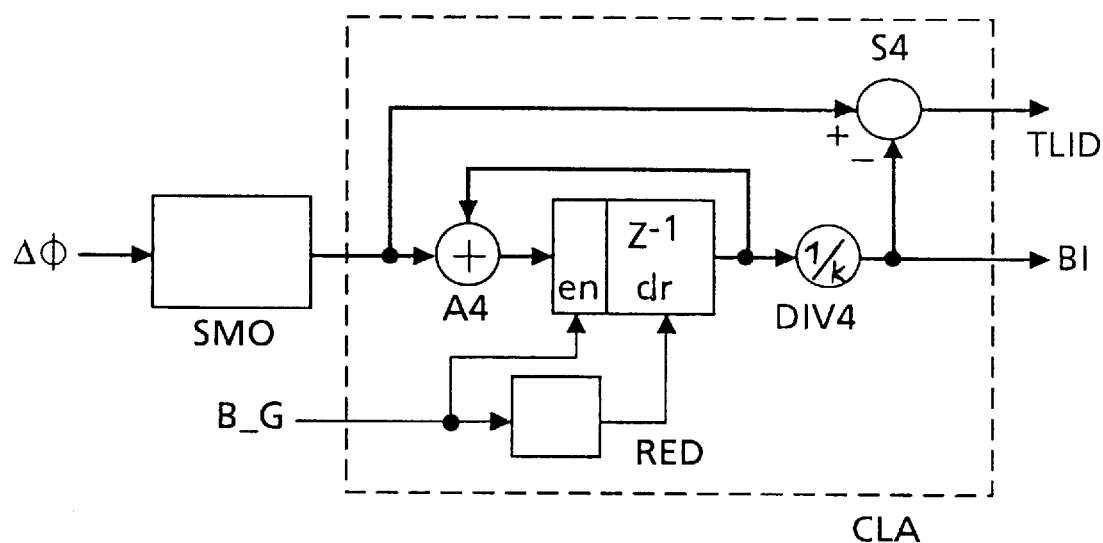
FIG. 4 an implementation of clamping.

An example implementation of the clamping is illustrated in FIG. 4. This circuitry is included in DCL. The differentiated phase signal $\Delta\Phi$ may pass through a preprocessing stage SMO including a smoothing function to an adder A4 and to an subtractor S4. The output signal of A4 passes through a one-sample delay $Z^{-1}$ and an 1/K divider DIV4 to the subtracting input of S4. The divider output signal forms the bias BI. BI can generally be obtained by averaging the demodulation output signal $\Delta\tau(t)$ during the color carrier burst. This is controlled by a corresponding burst gate signal B_G. The clamping is done by subtracting the bias from the demodulation output signal. The delay output is fed back to the second input of adder A4. Delay $Z^{-1}$ is enabled (en) by B_G and is cleared (clr) by the output signal of a rising edge detector RED receiving B_G as input signal. The samples are added in such a way that each of the samples to be averaged is contained once in the sum. The value of K corresponds to the number of sample values to be averaged.

Figure 2:
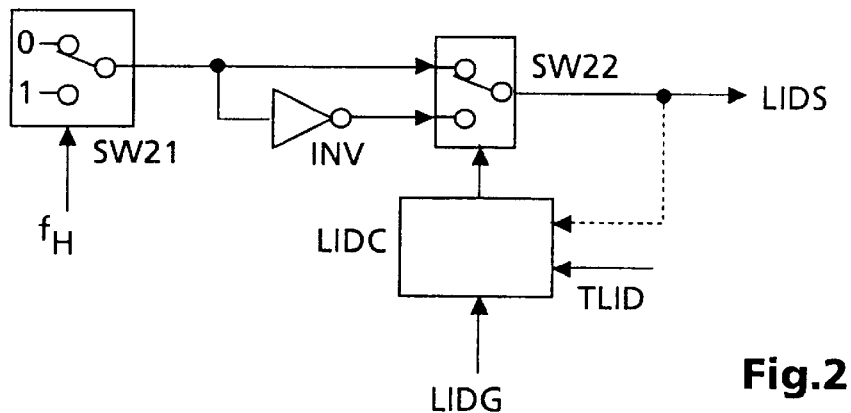
FIG. 2 circuitry for SECAM line identification.
Figure 3:
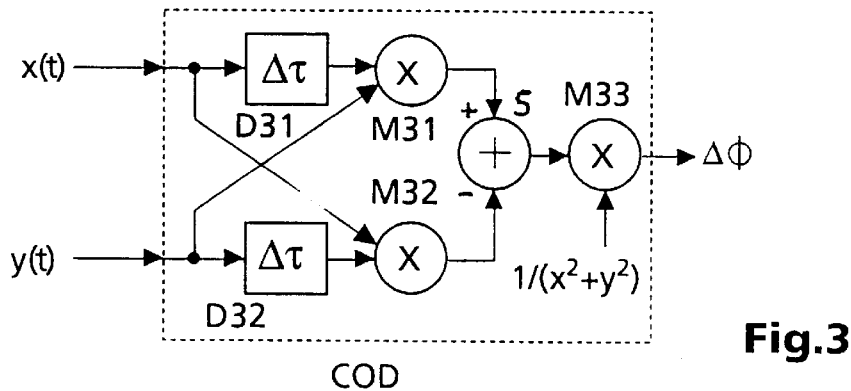
FIG. 3 detail of a further embodiment of the invention.

Advantageously, bias BI is also used for the line identification required in SECAM. For identifying the U and V lines the output signal TLID of S4 is fed to a line identification stage. Possible circuitry is shown in FIG. 2. A first switch SW21 which is controlled by the line frequency $f_H$ supplies either logical "0" or "1" to the first input of a second switch SW22 and to the input of an inverter INV. The output of INV is connected to the second input of switch SW22. SW22 is controlled by a line identification checking unit LIDC. The output of SW22 is the line ID signal LIDS. LIDC judges the correctness of LIDS by checking the bias value. If a fixed mixer frequency fm between 4.250 MHz and 4.406 MHz is used, the bias should take a positive value for a U line and a negative one for a V line. It is also possible to switch $f_m$ line-alternately to 4.250 MHz and 4.406 MHz. Then the correct bias value should be near to zero. LIDG is a control signal which provides for a proper timing window for the checking. Instead of using a CORDIC processor followed by a differentiation stage one can use a circuitry as depicted in FIG. 3. Signal x(t) passes through a first sample delay D31 to the first input of a first multiplier M31 and is fed to the second input of a second multiplier M32. Signal y(t) is fed to the second input of the first multiplier M31 and passes through a second sample delay D32 to the first input of the second multiplier M32. In a subtractor S the output signal of M32 is subtracted from the output signal of M31. The resulting signal is multiplied in a following third multiplier M33 by 1/{$x^2(t)+y^2(t)$}, leading to the differentiated phase signal $\Delta\Phi$. The following applies for SECAM signals in the circuitry of FIG. 3:

$$c(t) = B'(t)\cos\left(2\pi\left[f_m(t) + k\int_0^t D^*(\tau)d\tau\right]\right)$$

$$x(t) \approx B'(t - \tau_{LP})\cos\left(2\pi k\int_0^{t-\tau_{LP}} D^*(\tau)d\tau\right)$$

$$y(t) \approx B'(t - \tau_{LP})\sin\left(2\pi k\int_0^{t-\tau_{LP}} D^*(\tau)d\tau\right)$$

It is supposed that:

$$B'(t) \approx B'(t-\Delta\tau)$$

$$2\pi k\int_{t-\Delta\tau}^t D^*(\tau)d\tau \approx 2\pi * (kD^*(t))^*\Delta\tau \ll \pi/6$$

then:

$$\Delta\Phi(t) = 2\pi * \Delta\tau * kD^*(t-\tau_{LP})$$

One possibility is to select a sampling and clock frequency which equals e.g. four times the color carrier frequency, i.e. 4*$f_c$. It is also possible to select a sampling and clock frequency of e.g. 18 MHz, i.e. which is not a multiple of $f_c$. Contrary to that in the Hilbert filter method mentioned in the prior art above a sampling frequency of non-fourfold color carrier frequency leads to a significantly more complicated design.

In comparison to a simple combination of the conventional digital PAL/NTSC and SECAM color demodulators, the proposed multi-standard solution is easier to implement and there is more design freedom concerning the clock frequency.

What is claimed is:

1. Method for digitally demodulating a SECAM signal having two color components, each being modulated on a different one of two standardized color carriers having a different frequency, the method comprising the step of:

initially demodulating said two color components using a single quadrature mixer with a single mixing frequency lying between and including said standardized color carrier frequencies.

2. Method according to claim 1, comprising the additional step of:

calculating a function arctan(y/x) of two output signals x and y of said single quadrature mixer, in order to get a SECAM phase signal which is to be differentiated subsequently, wherein x is a quadrature mixer output signal that has been multiplied by a cosine function of said single mixing frequency and y is a quadrature mixer output signal that has been multiplied by a sine function of said single mixing frequency.

3. Method according to claim 2, comprising the additional step of:

correcting a resulting bias effect, caused by said single mixing frequency not matching said standardized color carrier frequencies, by a corresponding clamping operation subsequent to said arctan (y/x) function calculation.

4. Method according to claim 3, comprising the additional step of:

using said bias effect for identification of U and V lines of said two color components.

5. Method according to claim 2, comprising the additional step of:

carrying out said arctan (y/x) calculation in a CORDIC processor wherein in particular also an amplitude value $\sqrt{(x^2+y^2)}$ is calculated that is used as a control signal for automatic color control.

6. Method according to claim 1, comprising the additional step of:

using said single quadrature mixer for digitally demodulating with a correspondingly selected mixing frequency, color components of a PAL or NTSC signal.

7. Apparatus for digitally demodulating colour components of a PAL or NTSC or SECAM signal, the apparatus including:

a quadrature mixer which outputs either color components of the PAL or NTSC signal or, in case of the SECAM signal, an x and an y signal using a single mixing frequency resulting in a bias effect caused by non-standard-matching color carrier mixing frequency or frequencies;

a stage, in particular a CORDIC processor, which in case of the SECAM signal calculates a function arctan(y/x);

a subsequent stage in which a differentiation and a clamping is performed on a signal provided by the arctan(y/x) function, wherein said bias effect is corrected by a corresponding clamping operation and wherein the SECAM color components are obtained through an identification of U and V lines of the SECAM colour components.

8. Apparatus for digitally demodulating colour components of a PAL or NTSC or SECAM signal, the apparatus including:

a quadrature mixer which outputs either colour components of the PAL or NTSC signal or, in case of the SECAM signal, an x and an y signal thereby switching a mixing frequency for said demodulation line-alternately to one of two standardized SECAM color carrier frequencies;

a stage, in particular a CORDIC processor, which in case of the SECAM signal calculates a function arctan(y/x);

a subsequent stage in which a differentiation is performed on a signal provided by the arctan(y/x) function, wherein the SECAM color components are obtained through an identification of U and V lines of the SECAM color components.

* * * * *